(12) United States Patent
Collins et al.

(10) Patent No.: US 9,960,853 B2
(45) Date of Patent: May 1, 2018

(54) SYSTEM AND METHOD FOR A DIFFERENTIAL PULSE POSITION MODULATION ENCODER AND DECODER

(71) Applicants: Daniel Collins, Toms River, NJ (US); Glenn Shevach, Lakewood, NJ (US); Mark Blair, Lumberton, NJ (US)

(72) Inventors: Daniel Collins, Toms River, NJ (US); Glenn Shevach, Lakewood, NJ (US); Mark Blair, Lumberton, NJ (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 36 days.

(21) Appl. No.: 15/284,680

(22) Filed: Oct. 4, 2016

(65) Prior Publication Data

US 2018/0097568 A1    Apr. 5, 2018

(51) Int. Cl.
*H04B 10/524* (2013.01)
*H04B 10/60* (2013.01)

(52) U.S. Cl.
CPC .......... *H04B 10/524* (2013.01); *H04B 10/60* (2013.01)

(58) Field of Classification Search
CPC ..... H04L 25/4902; H04L 5/06; H04B 14/026; H04B 14/066
USPC ......................................................... 398/191
See application file for complete search history.

(56) References Cited

U.S. PATENT DOCUMENTS

| 6,711,122 | B1 * | 3/2004 | Langley ............... | H04B 14/026 370/205 |
| 2005/0078021 | A1 * | 4/2005 | Cohen ..................... | H03M 5/08 341/68 |
| 2006/0070079 | A1 * | 3/2006 | Franchuk .............. | G06F 9/4443 719/315 |
| 2011/0058602 | A1 * | 3/2011 | Farine ................. | H04B 1/71637 375/239 |

* cited by examiner

*Primary Examiner* — Don N Vo
(74) *Attorney, Agent, or Firm* — Marl. O. Glut; NAWCAD (57) ABSTRACT

A system and method using Differential Pulse Position Modulation (DPPM) to encode digital data so that it can be transmitted using an infrared (IR) link. The digital data is then decoded upon receipt. This invention can be implemented in software and run on an FPGA (or the like) for prototyping and integration with existing designs. The encoding, decoding and sensitive timing are handled by dedicated hardware, which greatly increases the speed of these processes because it frees up the processor to accomplish other tasks.

8 Claims, 7 Drawing Sheets

SYSTEM AND METHOD FOR A DIFFERENTIAL PULSE POSITION MODULATION ENCODER AND DECODER

STATEMENT OF GOVERNMENT INTEREST

The invention described herein may be manufactured and used by or for the Government of the United States of America for governmental purposes without payment of any royalties thereon or therefor.

BACKGROUND

Differential Pulse Position Modulation (DPPM) is used in applications that require power efficiency and fast communication links. A single pulse encodes multiple bits of data in the differential time between pulses. Transmitting four bits of data at a time decreases processing. Additionally, the only important measurement is the rising edge of each pulse. The pulse itself can be shorter than a full clock cycle, which saves power. Since many devices using infrared transmission rely on batteries and relatively slow processors, these advantages make DPPM encoding well suited for infrared data transmission.

When transmitting a signal through cabling, it is common to also transmit a clock signal alongside the data on an additional wire. This is not commonly done when using wireless communications, because including a dedicated clock signal requires an extra transmitter/receiver pair. Differential Pulse Position Modulation is a scheme that is asynchronous—the receiver does not need to have a clock that is synchronized with the transmitter, introducing significant savings in bandwidth and hardware costs.

Infrared communications often use a Light-Emitting Diode (LED) as a low cost transmitter. However, there is a maximum rate at which any given LED can be switched. In order to exceed a certain data rate without custom or high performance hardware or another transmission method, it is necessary to transmit more than one bit of data through a single pulse.

Existing commercial IR transceivers are rated up to four Mbits/s and automatically transmit pulses of fixed duration for each input rising edge. These are primarily designed to be used with plain serial data, and most commonly support only a limited speed of 115.2 kbit/s using a basic serial data protocol such as Universal Asynchronous Receiver/Transmitter (UART). There are also commercial IR LEDS and sensors which can be used to replace one of these transceivers, and are available at multiple levels of performance.

There are also peripherals built into many common microcontrollers available to convert data from serial into Serial IR 115.2 kbs protocol. However, these are limited to that maximum speed and do not encode this protocol. State of the art peripherals do not use DPPM encoding nor do they operate above 115.2 kbs. Therefore, what is needed is an energy-efficient method to optimally encode data that can be transmitted over a high speed infrared link and decoded once received.

While it is possible to implement DPPM in the firmware of a microcontroller, it is not a task that a microcontroller can easily process in parallel with other tasks. In order to implement a reasonable speed (Mbps), the difference between pulse positions for a '3' versus a '4' can only be one or two clock cycles. If the microcontroller is engaged in some other task when a pulse is received, it may not be able to handle that data immediately. Even a slight delay in reception of consecutive symbols could corrupt the data.

SUMMARY

The current invention includes an encoder that converts data from a set of parallel digital lines to a single data stream. This data stream is suitable and optimized for transmission using an infrared LED. However, it can also be used with several alternate channels. The optimization involves limiting the amount of time the LED is "on" to conserve power, as well as allowing a receiver to decode the data, converting it back to parallel digital data, without requiring a synchronized clock.

There are parallel lines on each side of the encoder that interface with a microcontroller. The system of the current invention is not designed for any particular hardware. Instead, any processor with the read/write capability of at least six data lines is suitable. The method described here is optimized for use with a microcontroller with direct memory access (DMA) capability. DMA allows data to be read into or out of memory with minimal impact on other tasks that the processor is executing.

In an alternate embodiment of the current invention, the parallel data to/from the processors can be replaced with a serial data protocol, commonly supported on microcontrollers. This would still provide the benefits of high bandwidth, reduced power consumption, and eliminate the need for clock synchronization.

This method will work with commercial transceivers, as well as discrete LEDs and sensors. The invention provides a significant improvement by allowing the encoding to be done at a much higher speed than any existing hardware. The method can also be implemented in software and run on a Field Programmable Gate Array for rapid prototyping and integration with existing designs. The modulation scheme can be tested in a system at various speeds with minimal initial cost or specialized hardware. Additional embodiments allow for longer data words and error correction.

The major advantage this solution has over previous ones is that the encode/decode functions are implemented in hardware. With the hardware implementation, the processor is free to accomplish other tasks because it is not being limited by its speed and strict timing requirements. This implementation method frees up most of the microprocessor's resources by shifting the handling of the sensitive timing to dedicated hardware.

DRAWINGS

These and other features, aspects and advantages of the present invention will become better understood with reference to the following description and appended claims, and accompanying drawings wherein:

DESCRIPTION

In the following description of the present invention, reference will be made to various embodiments which are not all inclusive. The current invention can be implemented using various forms of software and hardware. However, the preferred embodiments and best mode of the present invention are illustrated by way of example below and in FIGS. 1 through 7.

Figure 1:
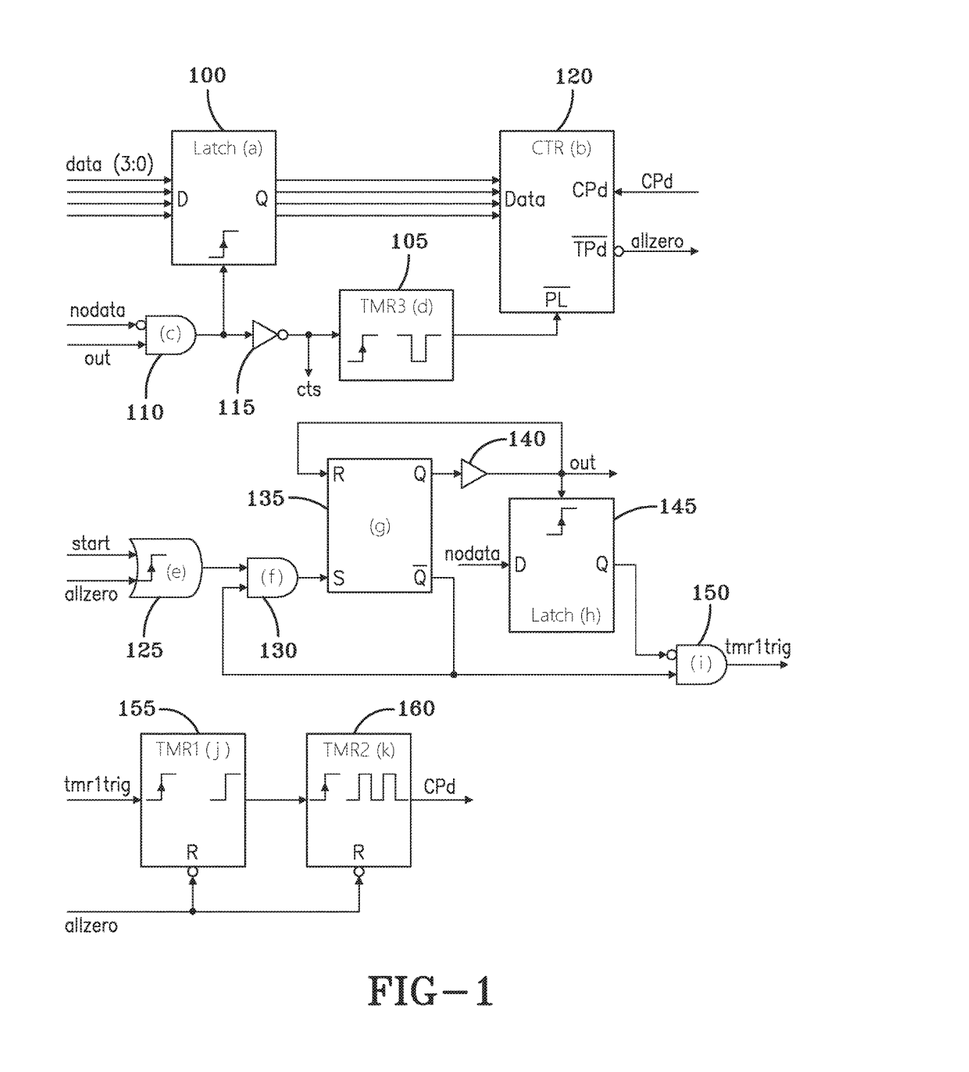
FIG. 1 is a block diagram of the hardware embodiment of an encoder.

Referring to the FIG. 1, an example hardware embodiment of an encoder for the current invention is shown with a block diagram. The signal data is a four-line bus of digital data from a microcontroller (not shown). The microcontroller must set the first set of data on this line before setting the 'start' signal. Every time thereafter that a rising edge arrives on signal 'cts' ("clear-to-send"), the microcontroller must either present new data or set a 'nodata' signal. The only other signal that is external to the encoder is an 'out' signal, which will drive the infrared (IR) emitter or other transmission channel.

Latch (100), in this embodiment, is a four-line D-type flip flop. When a rising edge is detected on the timer (105) input, the four bits of data on the input terminal D of latch (100) are copied to output terminal Q of latch (100). A timer (105) is driven by an AND gate (110), such that a rising edge will be presented to latch (100) whenever a 'nodata' signal is set and there is a rising edge on the 'out' signal of the AND gate (110). This prevents invalid data from being latched in and prevents the remaining triggers from firing if there is no additional data.

The trigger signal is then inverted by an inverter (115), yielding signal 'cts.' A rising edge on 'cts' is a falling edge of the latch (100) trigger, so 'cts' will only trigger after latch (100) is finished latching data. The pulse width on the 'out' signal, which controls the width of the trigger signal, and therefore the delay between rising edges on latch (100) and 'cts,' is long enough to allow latch (100) to finish latching the data before 'cts' will be set. The inverted trigger signal then activates timer (105). This timer's (105) pulse output is normally high, but upon receiving a rising edge signal, it generates a low pulse. This signal is routed to the pulse load ('PL') input of counter (120).

Whenever the 'PL' input to the counter (120) is low, it loads the data input into its internal memory. Then, when the Counter Pulse (down) (CPd) input (normally low) goes high, if the data in memory is zero, the count has reached its terminal state and Terminal Count (down) (TCd) output will go high. When the 'CPd' input goes low, the data in memory will be decremented by one. The 'CPd' input will be driven by a calibrated pulse train, such that the time it takes for 'TCd' to go high depends on the value of the data in memory.

This 'TCd' signal is also called 'allzero,' because it will go high when the data in the counter memory is all zero. An OR gate (125) will activate the output whenever either its input 'start' or its input 'allzero' has a rising edge. Edge detectors are used on each input to the OR gate (125). If the 'start' signal is triggered and there is no data yet, this is simply a signal indicating the start of a packet. If 'allzero' is triggered, then the pulse represents the current data. A second AND gate (130) prevents an undefined condition in flip flop (135) by forcing the 'S' input to the flip flop (135) to be low if the 'Q' output is high. Once the 'S' input is set, the 'Q' output goes (and stays) high, and 'Q-bar' goes low.

When 'Q' goes high, after passing through a delay buffer (140), the 'R' reset input to the flip flop (135) is triggered, clearing the flip flop (135). The length of the delay buffer (140) on 'Q' is configurable and controls the width of the output pulse. The output of the delay buffer (140) on 'Q' is the output signal 'out.' This signal triggers a second latch (145) on rising, which saves the value of 'nodata.' This is done before 'cts' is raised for the microprocessor, and prevents a race condition on 'nodata.' AND gate (150) sets 'tmr1trig' high on a rising edge of 'Q-bar' (a falling edge of 'out') if and only if the saved value of 'nodata' is low. Since this signal then triggers the timers (155 and 160) that will set the next signal, it can only be activated if there is more data to send. Finally, on a falling edge of 'allzero,' the timers (155 and 160) are both reset.

Figure 2:
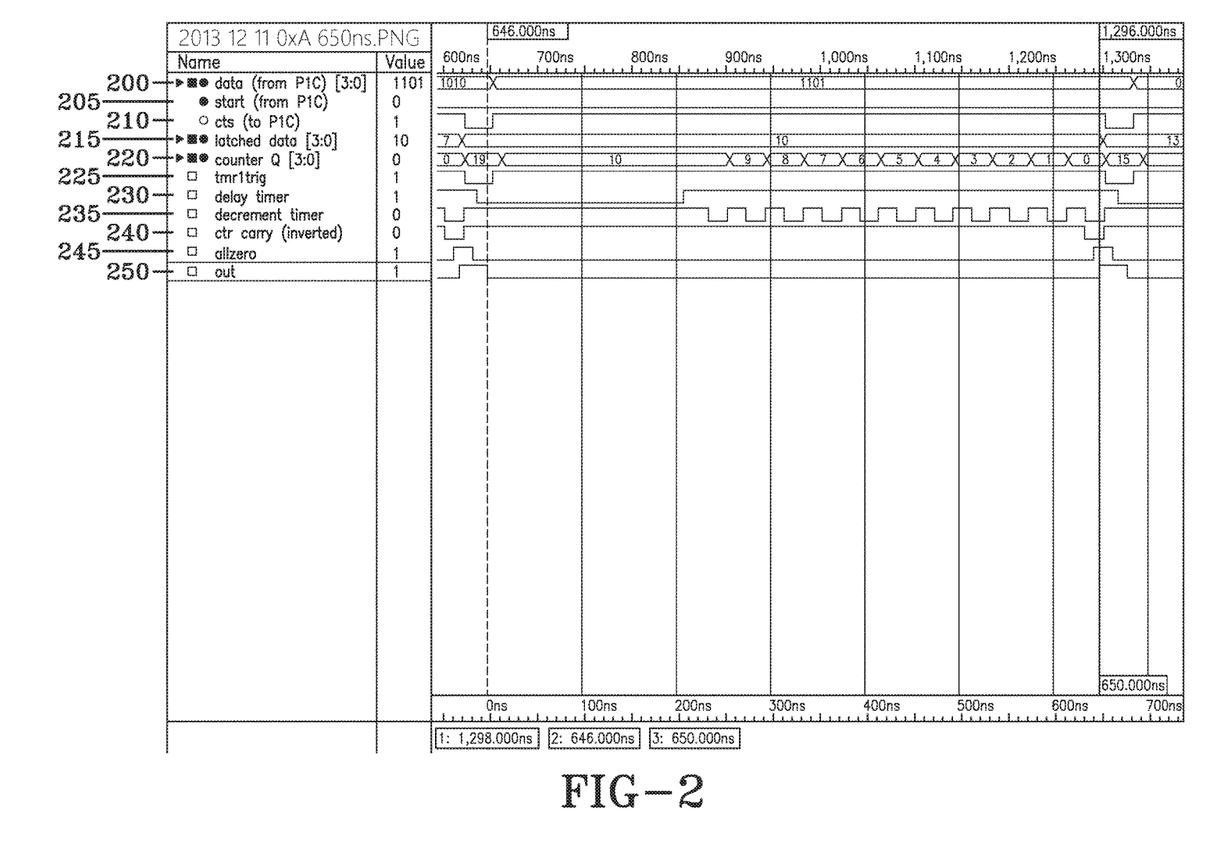
FIG. 2 is an embodiment of an encoding timing diagram.
Figure 3:
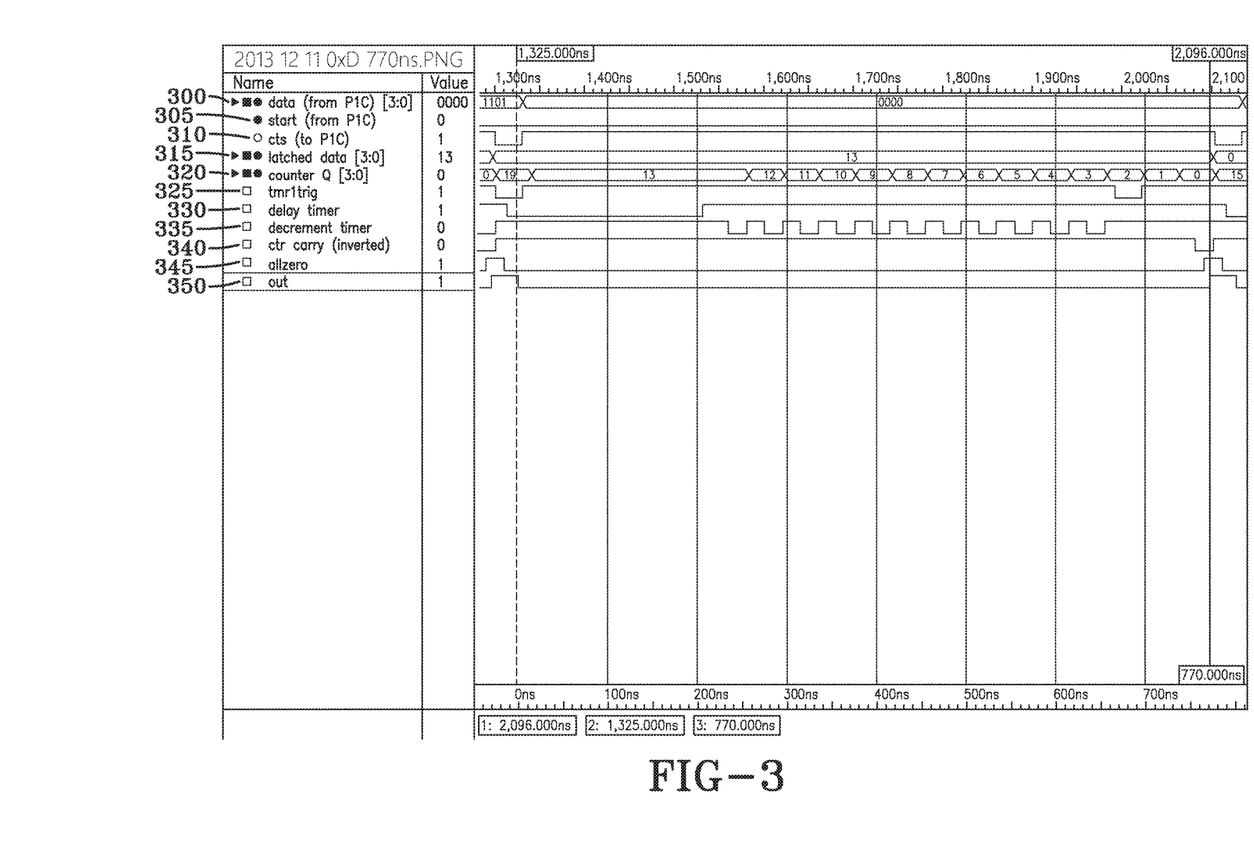
FIG. 3 is an alternate embodiment of an encoding timing diagram
Figure 4:
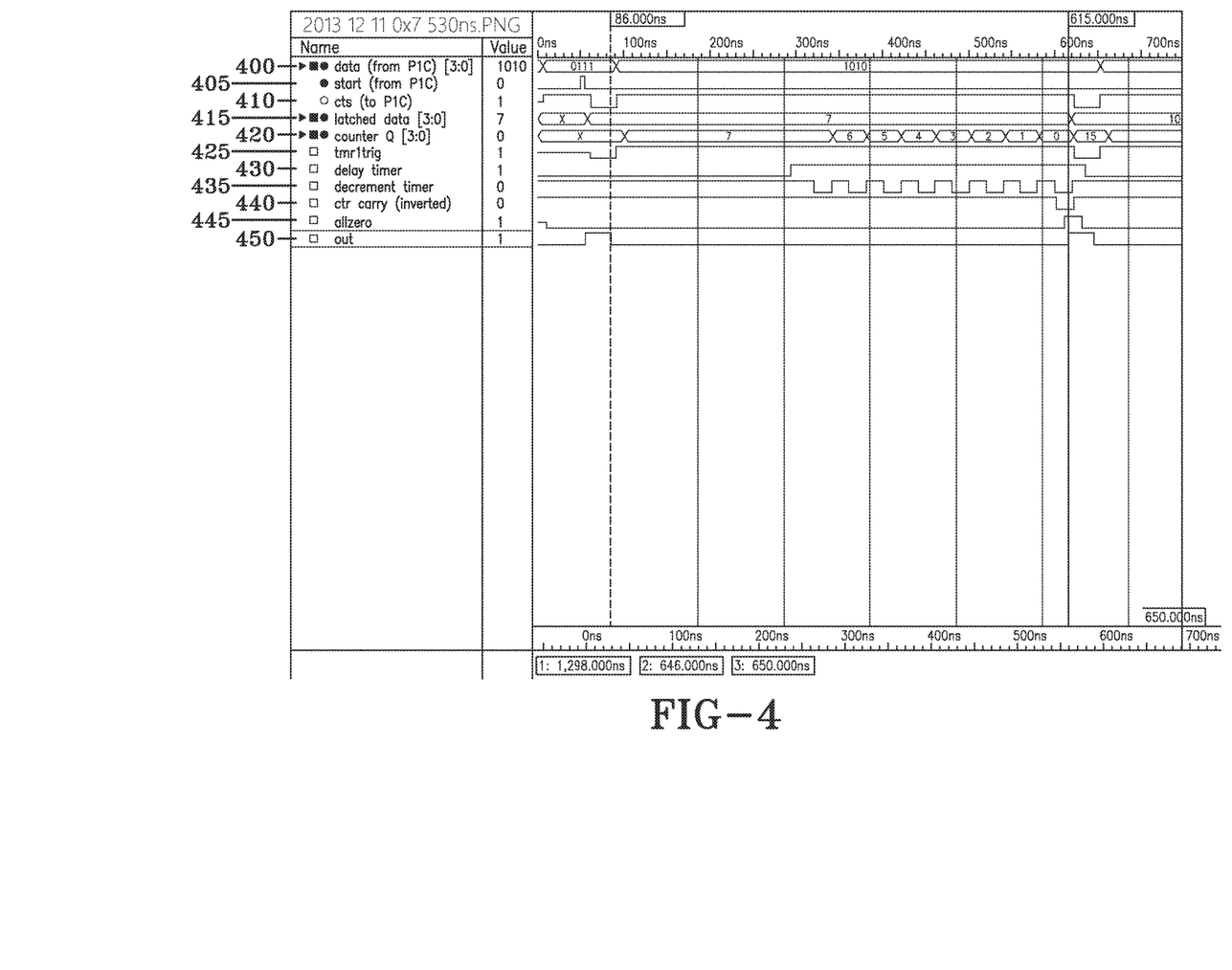
FIG. 4 is an alternate embodiment of an encoding timing diagram.

FIG. 2 is an embodiment of a simulation image showing the process of encoding the number 10. Speeds and timing can be tweaked per the hardware of choice and system requirements. Consequently, the exact timing of the encoding shown in FIG. 2 is not important.

There are 11 signals shown in FIG. 2 and their simulated encoding will be described in reference to the encoder shown in FIG. 1. The input (200) is shown with the notation 'data (from P1C).' This input (200) is displayed in binary ('1010' corresponds to decimal '10' and '1101' corresponds to decimal '13'). Note that immediately after the decimal number '10' is loaded into the latch (100) as 'latched data' (215), the output (210, denoted as clear to send, 'cts') of the latch (100), is set low, held briefly, and then set back high. This delay allows the latch (100) to fully latch the data. The rising edge on 'cts' (210) then instructs the microcontroller to send in the next data. The microcontroller has a window of at least 200 ns to complete this task, although this window of time can be varied based on the system requirements, The signal 'counterQ' (220) is the data stored in the counter (120). This occurs with a slight delay compared to 'cts' (210), which is provided by timer (100). Simultaneously, signal 'tmr1trig' (225), which triggers timer (155), is activated. In this simulation, 'cts' (210) and 'tmr1trig' (225) appear to be redundant, however a difference is seen at the end of the data packet. That is, when there is no more data, 'cts' (210) does not trigger, but 'tmr1trig' (225) must trigger to send out the last data.

Referring now to the two timer outputs, delay timer (230), from timer (155) and decrement timer (235) from timer (160) are connected together, so that the 'decrement timer' (235) does not begin until the 'delay timer' (230) is complete. This is necessary to create a minimum delay between adjacent pulses. This delay guarantees enough time for the microcontroller to cycle in or out new data. The specific length of this time depends on what other tasks are assigned to the microcontroller. The decrement timer (235) is then connected to the counter (120), and each rising edge decrements the counter data, counterQ (220). Additionally, at the falling edge of decrement timer (235), the counter checks whether the data is zero. If the data is zero, the counter lowers ctr carry (inverted) (240). The ctr carry signal (240) is delayed and inverted by an inverter directly connected to the counter (not displayed in the simulation) to create the allzero signal (245). The allzero signal (245) is then routed to basic logic gates (125) and (130) to trigger flip flop (135), which through another delay element activates a pulse on the out signal (250). A feedback loop in the flip flop (135) then creates the falling edge of the pulse. With the rising edge of the pulse on the out signal (250), new data is latched into the latched data signal (215), and cts (210) is triggered. On the falling edge of the out pulse (250), if there is more data, the timers (155 and 160) are once again triggered (i.e. falling edge of out (250) creates a rising edge on tmr1trig (225). The remaining signal, start (225), behaves the same as allzero (245), triggering logic gates (125) and (130) to trigger the output flip flop (135), sending a start marker on the out pulse (250) and starting the timers (155) and (160).

As illustrated in the timing diagram of FIG. 2, the data (200), which represents the decimal value '10' corresponds to a pulse delay of 650 ns. While the exact time is not meaningful, the relationship between the times is. Compare the timing in FIG. 2 to that in FIG. 3 (2013 12 11 0xD 770 ns), where the data (300) represents the decimal value '13' and corresponds to a pulse delay of 770 ns, and FIG. 4 (2013 12 11 0x7 530 ns), where the data (400) represents the decimal value 7 and corresponds to a pulse delay of 530 ns. A linear relationship has been created, where adding 1 to the data adds an extra 40 ns of delay. This relationship is designed to allow the hardware to decode data without any clock reference.

Figure 5:
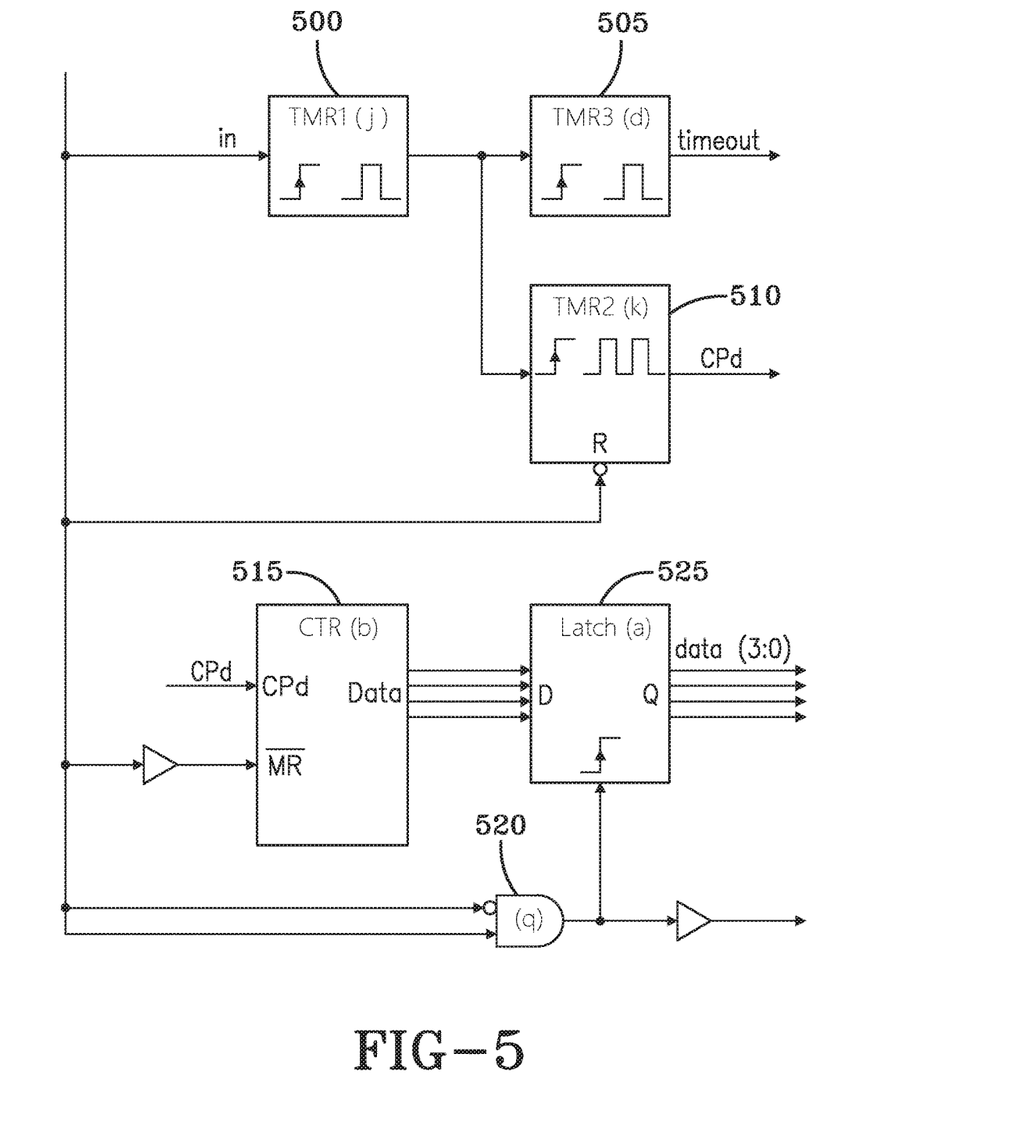
FIG. 5 is a block diagram of the hardware embodiment of a decoder.

Referring now to FIG. 5, an example hardware embodiment of a decoder for the invention is shown. Signal 'in' is the data stream from the infrared channel. Upon detecting any incoming pulse, timer (500) begins. This is simply a delayed pulse which triggers timer (505). Timer (510) outputs a pulse train until it is reset by the following signal. This pulse train 'CPu' is connected to the counter's (515) increment input. While timer (500) is still counting, after a brief delay, the counter's (515) master reset is triggered, setting the output data to '0'. The pulse train 'CPu' then begins to increment this data. When the next pulse is detected, timer (510) is reset. After passing a rising edge detector and a gate delay (520), the data from the counter (515) is latched into the output buffer (520). Next, two additional delay elements simultaneously trigger the master reset on the counter (515) and activates the 'newdata' signal which may be used to trigger an interrupt on the microcontroller. During this time, timer (500) is already counting for the next pulse. This sequence repeats indefinitely. Timer (505) activates a timeout pulse at the end of the packet. The length of timer (505) is slightly longer than the longest permissible delay between pulses. The 'timeout' signal then resets timer (510) and the counter (515) and latches the reset data (all '0') into the output latch (525) without activating the 'newdata' signal.

Figure 6:
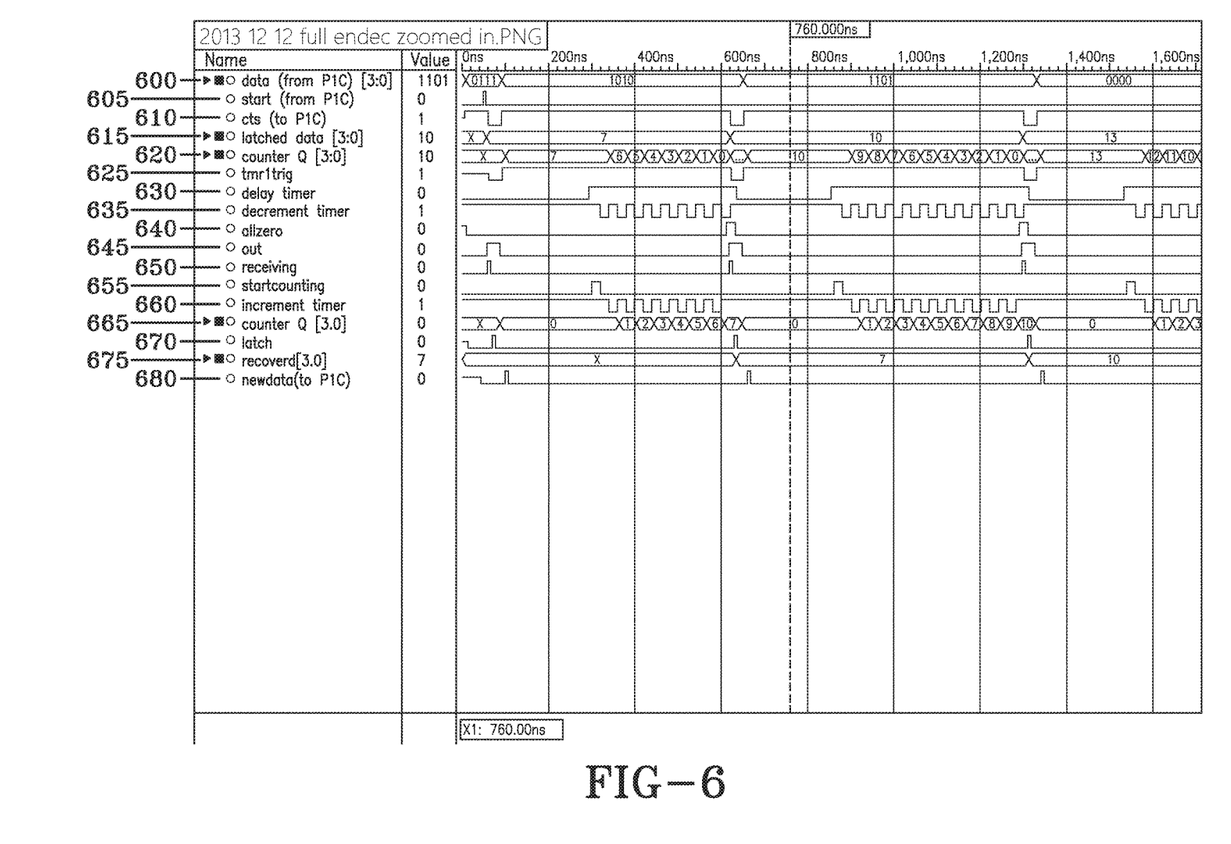
FIG. 6 is an embodiment of an encoding and decoding timing diagram.

Referring now to the timing diagram FIG. 6 (2013 12 12 full endec zoomed in image), in reference to the hardware shown in FIG. 5, the beginning of 17 different signals, including both the encoder and decoder is shown. Signals (600)-(645) were described above. Signal (650) 'receiving' is not used. Signal (655) 'startcounting' is the output from the first timer (500) which triggers the second timer (510). Signal (660) 'increment timer' is the output from timer (510). The rising edges of this signal are connected to the counter (515) and cause the data 'counterQ' (665) to increment. This continues until the next output pulse is received (645). Next, the latch is triggered by the signal 'latch' (670). The data in the latch is shown by signal 'recovered' (675). The signals counter (515), 'counter' (665), timer (510), and 'increment timer' (660) are reset. Then, the 'newdata' signal (680) is pulsed to allow the microcontroller interrupt to fire and read in data from the latch (670).

Figure 7:
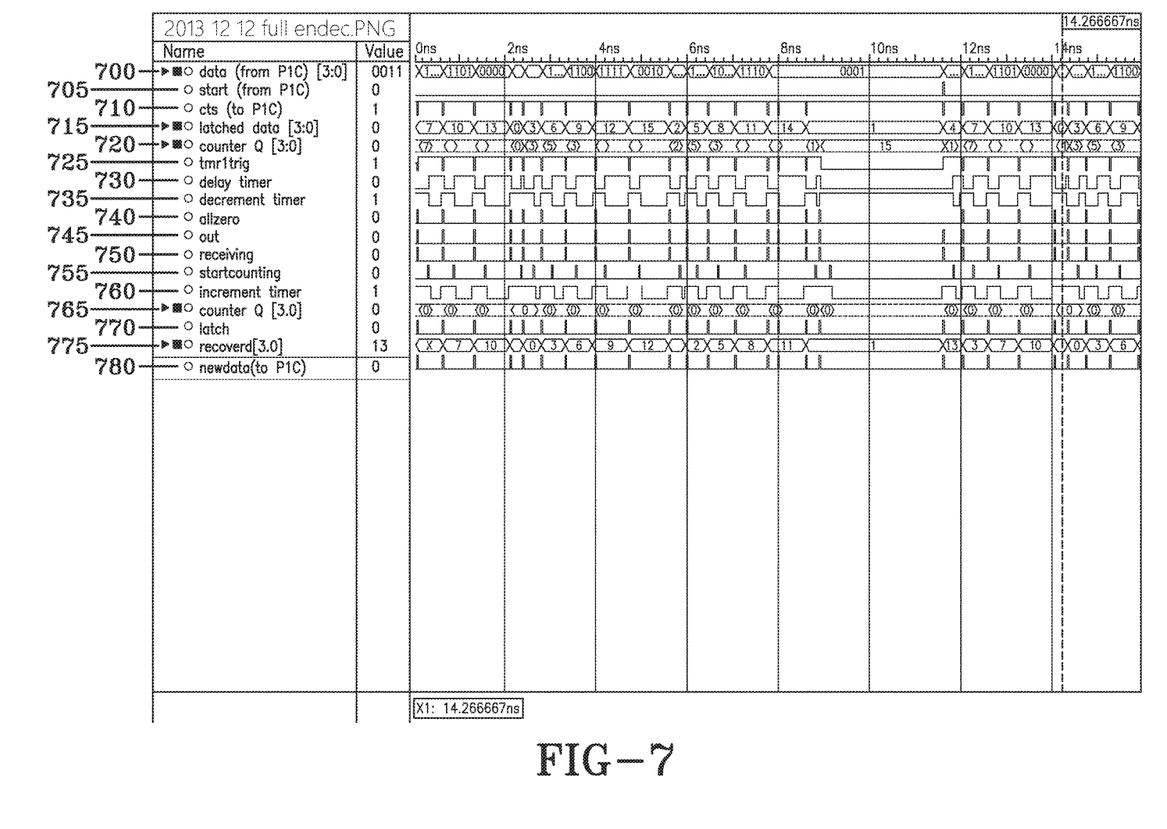
FIG. 7 is an alternate embodiment of a simulated encoding and decoding timing diagram.

FIG. 7 shows the same encoding with a longer packet. Note how the first packet ends. There is a pause around 10 microseconds, and then new data is sent, stalling at around 12 microseconds. Also note that the signals 'latched data' (715) and 'recovered' (775) show the same data in the same order, with only a slight delay to allow for processing.

The method of encoding digital data includes receiving a first digital signal data from a source; storing the first digital signal data in a latch; sending an instruction to the source that it is clear to send a second digital signal data; storing the first digital signal data in the counter; activating a delay timer trigger for a delay timer and a decrement timer trigger for a decrement timer simultaneously with storing the first digital signal data to a counter; sending a signal to output a DPPM pulse simultaneously with storing the first digital signal data to a counter; connecting the decrement timer to the counter; decrementing the first digital signal data stored in the counter by one on each rising edge of a decrement timer pulse; checking the counter to determine whether the first digital signal data is zero at each falling edge of the decrement time pulse; sending an signal to output a DPPM pulse when the first digital signal data is decremented to zero; receiving a second digital signal data; and, repeating the above steps, except for sending a signal to output a DPPM pulse simultaneously with storing the first digital signal data to a counter, until the source sends an instruction that there is no more data to be transmitted.

The above description is that of current embodiments of the invention. Various alterations and changes can be made without departing from the spirit and broader aspects of the invention as defined in the appended claims.

What is claimed is:

1. A method of encoding digital data comprising:
receiving a first digital signal data from a source;
storing the first digital signal data in a first latch;
sending an instruction to the source that it is clear to send a second digital signal data;
storing the first digital signal data in a first counter;
activating a first delay timer trigger for a first delay timer and a, decrement timer trigger for a decrement timer simultaneously with storing the first digital signal data to the first counter;
sending a signal to output a Differential Pulse Position Modulation (DPPM) pulse simultaneously with storing the first digital signal data to the first counter;
connecting the decrement timer to the first counter;
decrementing the first digital signal data stored in the first counter by one on each rising edge of a decrement timer pulse;
checking the first counter to determine whether the first digital signal data is zero at each falling edge of the decrement time pulse;
sending a signal to output a DPPM pulse when the first digital signal data is decremented to zero; and
receiving a second digital signal data; and,
repeating the above steps, except for sending a signal to output a DPPM pulse simultaneously with storing the first digital signal data to the counter, until the source sends an instruction that there is no more data to be transmitted.

2. The method of claim 1, wherein the delay timer and the decrement timer are connected so that the decrement timer does not begin until the delay timer is complete to create a minimum delay time between adjacent signal pulses to guarantee the source to cycle in or out new data.

3. The method of claim 2, wherein the minimum delay time depends on what additional task are assigned to the source.

4. The method of claim 3, wherein sending a signal to output the first digital signal data when the first digital signal data is decremented to zero is delayed.

5. The method of claim 1, wherein the method is implemented using discrete components, using an integrated circuit designed for that purpose, using a Hardware Description Language (HDL) on a Complex Programmable Logic Device (CPLD), Field-Programmable Gate Array (FPGA).

6. The method of claim 1, where components are synchronized within a transmitter using a clock signal, such that the clock need not be transmitted with the data to allow it to be decoded.

7. The method of claim 1, where an additional parity bit or other error correction scheme is added to allow for error detection or error correction.

8. A method of decoding the DPPM data described above, comprising:
   receiving an input signal that was encoded by the method of claim 1;
   detecting each DPPM pulse;
   clearing a second counter simultaneously with detecting the first DPPM pulse;
   activating a second delay timer trigger for a second delay timer and an increment timer trigger for an increment timer simultaneously with detecting each DPPM pulse;
   connecting the increment timer to the second counter;
   incrementing the second counter by one on each rising edge of an increment timer pulse;
   storing the current counter value in the second counter simultaneously with detecting the next DPPM pulse,
   clearing the current counter value once it has been successfully stored in the second counter;
   sending a signal to a controller that data is ready to be read; and,
   repeating the above steps until no more DPPM pulses are received.

* * * * *